(12) United States Patent
Cui

(10) Patent No.: US 12,244,673 B2
(45) Date of Patent: Mar. 4, 2025

(54) METHOD AND SYSTEM FOR METAVERSE AND PHYSICAL WORLD ASSOCIATION AND MAPPING

(71) Applicant: AT&T Intellectual Property I, L.P., Atlanta, GA (US)

(72) Inventor: Zhi Cui, Sugar Hill, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 20 days.

(21) Appl. No.: 17/846,506

(22) Filed: Jun. 22, 2022

(65) Prior Publication Data

US 2023/0421646 A1    Dec. 28, 2023

(51) Int. Cl.
*H04L 67/51* (2022.01)
*G06T 19/00* (2011.01)
*H04L 67/131* (2022.01)

(52) U.S. Cl.
CPC ........... *H04L 67/51* (2022.05); *G06T 19/00* (2013.01); *H04L 67/131* (2022.05); *G06T 2200/24* (2013.01)

(58) Field of Classification Search
CPC ....... H04L 67/51; H04L 67/131; G06T 19/00; G06T 2200/24
See application file for complete search history.

(56) References Cited

U.S. PATENT DOCUMENTS

| | | | |
|---|---|---|---|
| 7,620,658 B2 * | 11/2009 | Benson | H04L 61/4552 707/999.102 |
| 10,063,415 B1 | 8/2018 | Kanakarajan | |
| 10,405,193 B1 | 9/2019 | Cui et al. | |
| 11,126,618 B1 * | 9/2021 | Padmanabhan | G06F 16/252 |
| 11,159,408 B2 * | 10/2021 | Svennebring | H04W 24/08 |
| 11,425,606 B1 * | 8/2022 | Al-Bado | H04W 88/18 |
| 2005/0027713 A1 * | 2/2005 | Cameron | H04L 63/083 |
| 2017/0318468 A1 | 11/2017 | Aijaz | |
| 2018/0199218 A1 | 7/2018 | Ashrafi | |
| 2019/0052549 A1 | 2/2019 | Duggal et al. | |
| 2019/0260641 A1 | 8/2019 | Giust et al. | |
| 2020/0136929 A1 | 4/2020 | Takla et al. | |
| 2022/0038902 A1 * | 2/2022 | Mueck | H04W 52/367 |
| 2022/0337611 A1 * | 10/2022 | Brazao | H04L 9/50 |
| 2022/0361084 A1 | 11/2022 | Cui et al. | |
| 2023/0262412 A1 * | 8/2023 | Mclachlan | H04L 67/52 455/563 |
| 2023/0298008 A1 * | 9/2023 | Sarin | H04L 9/50 705/69 |
| 2023/0351704 A1 * | 11/2023 | Mclachlan | G06V 20/20 |
| 2023/0421448 A1 | 12/2023 | Cui et al. | |

* cited by examiner

*Primary Examiner* — Michael A Keller
*Assistant Examiner* — Thao D Duong
(74) *Attorney, Agent, or Firm* — Guntin & Gust, PLC; Douglas Schnabel

(57) ABSTRACT

Aspects of the subject disclosure may include, for example, obtaining information regarding a metaverse object and data regarding network resources, deriving a mapping between the metaverse object and one or more of the network resources based on the information and the data, and providing a hybrid service design and orchestration (H-SDO) system with access to the mapping to facilitate selection of particular network resources for supporting one or more metaverse service requests relating to the metaverse object. Other embodiments are disclosed.

20 Claims, 9 Drawing Sheets

METHOD AND SYSTEM FOR METAVERSE AND PHYSICAL WORLD ASSOCIATION AND MAPPING

FIELD OF THE DISCLOSURE

The subject disclosure relates to metaverse and physical world association and mapping.

BACKGROUND

Hailed as the next generation of the Internet, the metaverse enables interactions between the physical and digital worlds. For instance, the metaverse may offer an extended reality (XR) (e.g., augmented reality (AR), virtual reality (VR), or mixed reality (MR)) environment where users can explore, play, shop, socialize, or otherwise engage themselves in digitally-created spaces.

BRIEF DESCRIPTION OF THE DRAWINGS

Reference will now be made to the accompanying drawings, which are not necessarily drawn to scale, and wherein.

DETAILED DESCRIPTION

Figure 1:
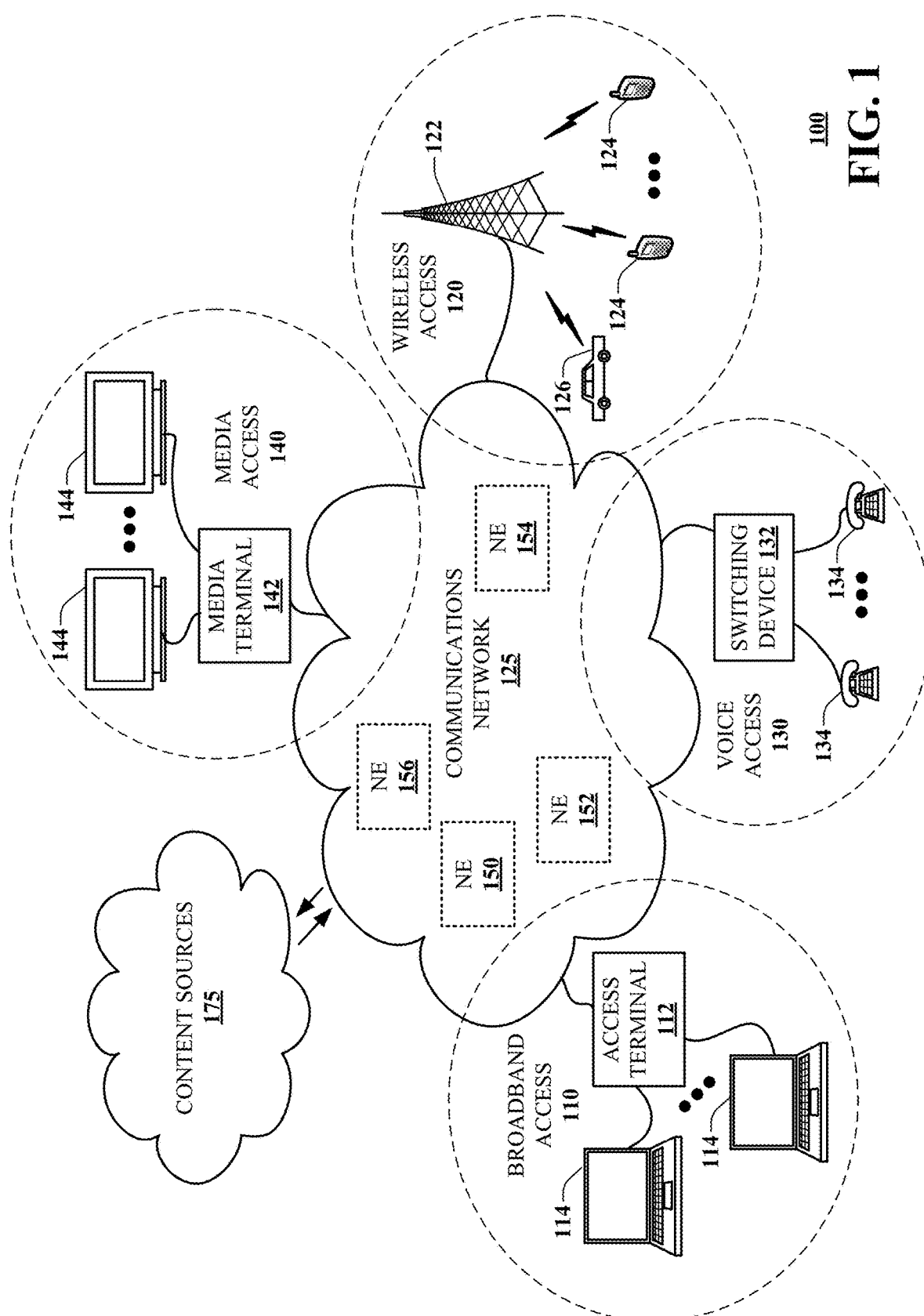
FIG. 1 is a block diagram illustrating an exemplary, non-limiting embodiment of a communications network in accordance with various aspects described herein.

The subject disclosure describes, among other things, illustrative embodiments of mapping between the metaverse and the physical world. The subject disclosure also describes illustrative embodiments of a metaverse service-oriented end-to-end (E2E) network architecture or framework that is capable of supporting metaverse services. In exemplary embodiments, metaverse object attributes may be defined and mapped/associated (e.g., via a logical entity or system) with the physical world, such as physical/logical network resources (e.g., access network resources, transport network resources, and/or core network resources) and/or their capabilities. This provides for true (and efficient) connections and interactions between the two worlds. In various embodiments, both physical world resources and virtual (or metaverse) resources may be abstracted (e.g., via the logical entity or system) as universal resource ports (or the like) that are selectable for "chaining" (or "stitching") to facilitate delivery of metaverse services.

One or more aspects of the subject disclosure include a device, comprising a processing system including a processor, and a memory that stores executable instructions that, when executed by the processing system, facilitate performance of operations. The operations can include obtaining information regarding a metaverse object and data regarding network resources. Further, the operations can include deriving a mapping between the metaverse object and one or more of the network resources based on the information and the data. Further, the operations can include providing a hybrid service design and orchestration (H-SDO) system with access to the mapping to facilitate selection of particular network resources for supporting one or more metaverse service requests relating to the metaverse object.

One or more aspects of the subject disclosure include a non-transitory machine-readable medium, comprising executable instructions that, when executed by a processing system of a network system including a processor, facilitate performance of operations. The operations can include mapping a metaverse object with physical network resources, logical network resources, or a combination thereof. Further, the operations can include causing a metaverse service to be provided for a mobile user device based on the mapping, wherein the network system comprises a plurality of access networks including access network resources, a plurality of transport networks including transport network resources, and a plurality of core networks including core network resources, and wherein the access network resources, the transport network resources, and the core network resources are abstracted into respective universal resource ports that are selectable to provide the metaverse service.

One or more aspects of the subject disclosure include a method. The method can include causing, by a processing system including a processor, a metaverse service request to be submitted to a hybrid software-defined network (H-SDN). Further, the method can include receiving, by the processing system, a metaverse service based on the metaverse service request, wherein the H-SDN includes a metaverse service and physical world mapping and abstraction layer that maps metaverse object attributes with network resources of one or more access networks, one or more transport networks, and one or more core networks.

Other embodiments are described in the subject disclosure.

Referring now to FIG. 1, a block diagram is shown illustrating an example, non-limiting embodiment of a system 100 in accordance with various aspects described herein. For example, system 100 can facilitate mapping/associating of metaverse objects with the physical world, such as physical/logical network resources (e.g., access network resources, transport network resources, and/or core network resources) and/or their capabilities. As another example, system 100 can include, provide, or be used with, in whole or in part, a metaverse service-based E2E network architecture in which both physical world resources and virtual world (metaverse-related) resources are abstracted as selectable universal resource ports and where metaverse services are delivered via dynamic, intelligent composition of functions and interfaces using select ones of the universal resource ports. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
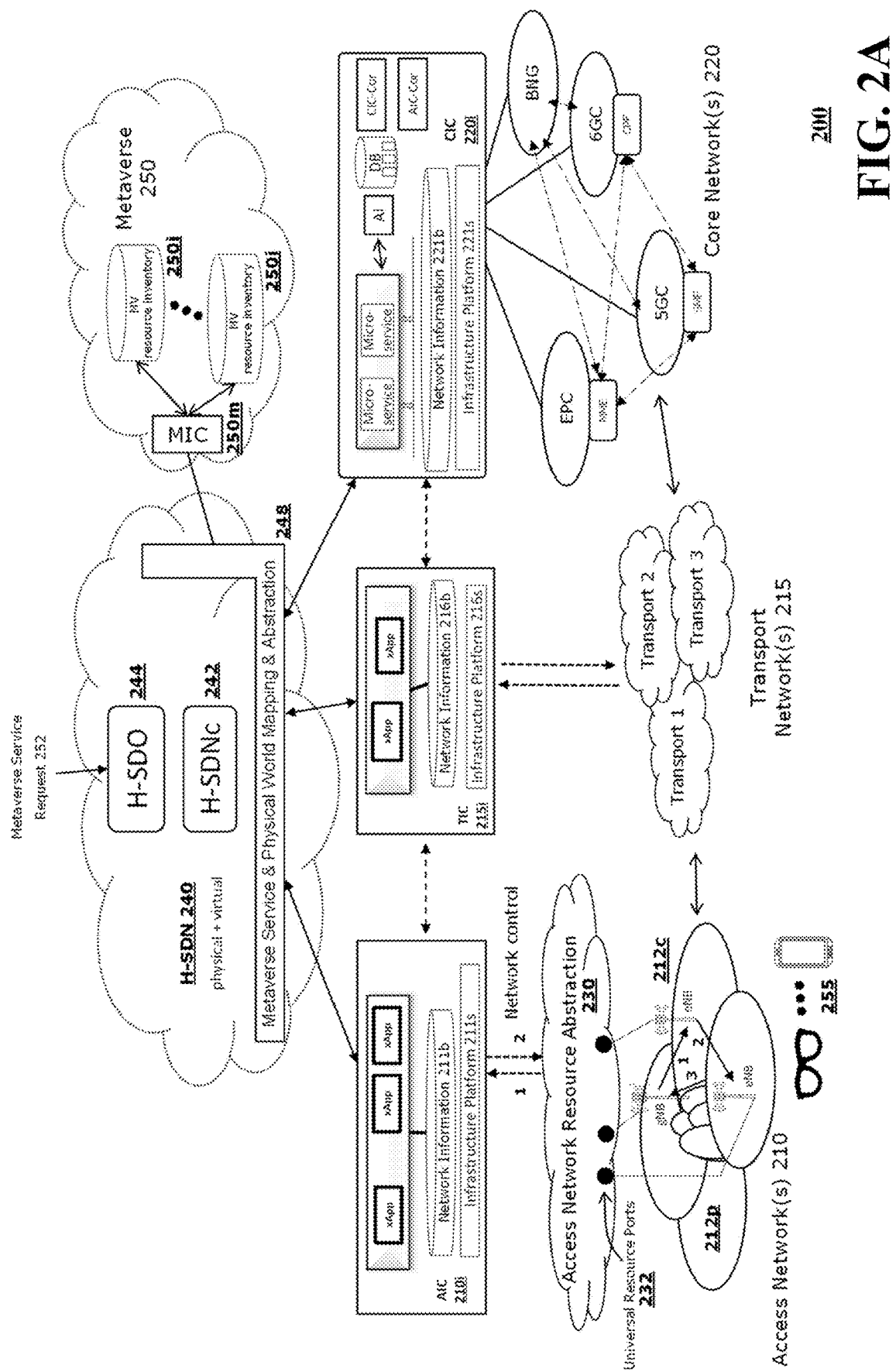
FIG. 2A is a block diagram illustrating an example, non-limiting embodiment of a system functioning within, or operatively overlaid upon, the communications network of FIG. 1 in accordance with various aspects described herein.

FIG. 2A is a block diagram illustrating an example, non-limiting embodiment of a metaverse E2E network architecture of a system 200 (e.g., a network system 200) functioning within, or operatively overlaid upon, the communications network 100 of FIG. 1 in accordance with various aspects described herein.

As shown in FIG. 2A, the network system 200 may include access network(s) 210 (e.g., wireless radio access network(s) (RAN(s)), Wi-Fi network(s), and/or wireline network(s)), transport (or backhaul) network(s) 215, and core network(s) 220.

The access network(s) 210 may include network resources, such as one or more physical resources (or network nodes) 212*p* and/or one or more logical resources 212*c*. As depicted, the physical resources 212*p* may include base station(s), such as one or more eNodeBs (eNBs), one or more gNodeBs (gNBs), or the like. In various embodiments, the physical resources 212*p* may additionally, or alternatively, include one or more satellites and/or uncrewed aerial vehicles (UAVs), one or more Gigabyte Passive Optical Networks (GPONs) and/or related components (e.g., Optical Line Terminal(s) (OLT), Optical Network Unit(s) (ONU), etc.), and/or the like. A base station may employ any suitable radio access technology (RAT), such as long term evolution (LTE), 5G, 6G, or any higher generation RAT. Although not shown, the logical resources 212*c* may include a voice service system (e.g., a hardware and/or software implementation of voice-related functions), a video service system (e.g., a hardware and/or software implementation of video-related functions, such as coder-decoder or compression-decompression (CODEC) components or the like), a security service system (e.g., a hardware and/or software implementation of security-related functions), and/or the like. In various embodiments, the access network(s) 210 can include various types of heterogeneous cell configurations with various quantities of cells and/or types of cells.

As shown in FIG. 2A, the access network(s) 210 may be in communication with the core network(s) 220 via intermediate links provided by the backhaul or transport network(s) 215. In exemplary embodiments, the transport network(s) 215 may include a mobile network or backhaul that is fiber-based and/or that is implemented via wireless point-to-point technologies. In certain embodiments, the transport network(s) 215 may additionally, or alternatively, be implemented using copper wireline, satellite communications technologies, and/or point-to-multipoint wireless technologies.

The core network(s) 220 may include various network devices and/or systems that provide a variety of functions. Examples of functions provided by, or included, in the core network(s) 220 include an access mobility and management function (AMF) configured to facilitate mobility management in a control plane of the network system 200, a User Plane Function (UPF) configured to provide access to a data network (such as a packet data network (PDN) in a user (or data) plane of the network system 200), a Unified Data Management (UDM) function, a Session Management Function (SMF), a Policy Control Function (PCF), and/or the like. For instance, as shown in FIG. 2A, the core network(s) 220 may include an evolved packet core (EPC) (associated with a mobility management entity (MME)), a 5G core (5GC) (associated with an SMF), a 6G core (6GC) (associated with a control plane function (CPF)), and a Broadband Network Gateway (BNG). In various embodiments, the core network(s) 220 may include one or more devices implementing other functions, such as a master user database server device for network access management, a PDN gateway server device for facilitating access to a PDN, and/or the like. The core network(s) 220 may be in further communication with one or more other networks (e.g., one or more content delivery networks (CDNs)), one or more services, and/or one or more devices. In one or more embodiments, some or all of the core network(s) 220 may be distributed cores.

It is to be appreciated and understood that the network system 200 can include any number/types of access network(s) 210 (e.g., any number/types of physical resources 212p and/or logical resources 212c), transport network(s) 215 (e.g., any number/types of intermediate links), core network(s) 220 (e.g., any number/types of cores, interfaces, etc.), and thus the number/types of these networks and their components shown in, or described with respect to, FIG. 2A are for illustrative purposes only.

The network system 200 can provide metaverse services to various types of user equipment (UEs), such as UEs 255. For example, a UE 255 can include a communication and/or computing device, such as a mobile phone (e.g., a smart phone, a radiotelephone, etc.), a desktop computer, a laptop computer, a tablet computer, a handheld computer, a display device, a gaming device, a wearable communication device (e.g., a smart wristwatch, a pair of smart eyeglasses, AR-/VR-/MR-related gear (e.g., a pair of glasses or googles, a headset, a hat, glove(s), a mask, a jacket, a sock or shoe, a pair of pants or shorts, headphones, and/or the like), etc.), a similar type of device, or a combination of some or all of these devices. UEs 255 can be equipped with one or more transmitter (Tx) devices and/or one or more receiver (Rx) devices configured to communicate with, and utilize network resources of, the network system 200.

As shown in FIG. 2A, the network system 200 may include an access network resource abstraction layer or system 230. In exemplary embodiments, the access network resource abstraction layer or system 230 may provide abstractions of the physical resources 212p and/or logical resources 212c. In various embodiments, the physical resources 212p and the logical resources 212c may be abstracted and be accessible via universal resource ports 232. In one or more embodiments, the abstractions may be from Layer 2 (e.g., Ethernet or data link layer) and above in the Open Systems Interconnection (OSI) Model. Such abstractions allow the physical resources 212p and the logical resources 212c to be presented to a hybrid software-defined network (H-SDN) 240 as universal resources (e.g., similar to plug-ins with a universal interface, such as the Universal Serial Bus (USB)), which can enable the H-SDN 240 to access and leverage the universal resources to provide or support metaverse services. In this way, for example, access, control, and usage of the physical resources 212p and the logical resources 212c of the access network(s) 210 may be all based on software from Layer 2 and above.

In various embodiments, each universal resource port 232 may correspond to a respective physical resource 212p or logical resource 212c. The physical resources 212p and the logical resources 212c may be abstracted to descriptor object(s) that identify the physical resources 212p and the logical resources 212c, the corresponding universal resource ports 232, and data associated with the physical resources 212p and the logical resources 212c. In one or more embodiments, the access network resource abstraction layer 230 may include a descriptor object for each physical resource 212p or logical resource 212c, the corresponding universal resource port 232, and the corresponding data, or may include a descriptor object (e.g., a single descriptor object) for all available or accessible physical/logical resources 212p/212c, corresponding universal resource ports 232, and associated data. The data for a universal resource may include, for example, information regarding a communication protocol associated with the universal resource, information regarding capabilities of the universal resource, information regarding services provided by the universal resource, information regarding an operating status of the universal resource, information regarding operational limits associated with the universal resource, and/or the like. Providing network resource abstractions enables a system, such as a hybrid service design and orchestration (H-SDO) system 244 to (e.g., optimally) select, and connect, cost-effective features or resources (e.g., access network resources, transport network resources, core network resources, etc.) to meet metaverse service needs.

Although not shown, in certain embodiments, abstractions of devices/components as universal resource ports (e.g., in Layer 2 and above and/or based on descriptor objects) may similarly be applied to other parts of the network system 200, such as the transport network(s) 215, the core network(s) 220, a metaverse 250, and so on.

As depicted in FIG. 2A, the metaverse 250 may include or may be associated with metaverse resource inventories 250i. Each metaverse resource inventory 250i may be implemented as a data structure (e.g., a database or the like) that stores information regarding (e.g., all relevant) metaverse objects of an immersive environment or experience. A metaverse object (i.e., an immersion) may include one or more user-interactable AR-, VR-, or MR-based constructs (e.g., three-dimensional (3D) graphic(s)/item(s), video object(s), audio object(s), and/or the like) that are designed to provide an immersive user experience, whether in the context of a game, a meeting, or other types of user-based interactions. For example, a metaverse object may include a virtual character or pathway that, when engaged by a user, interacts with the user (e.g., moves or talks with the user) and/or leads the user into an immersion (e.g., guides the user along a route, transitions the immersive environment to a different room or place, shows the user a video, etc.). As another example, a metaverse object may include a resource (e.g., a racecar, a weapon, etc.) that a user may control or manipulate in an immersive environment to achieve a goal. As yet another example, a metaverse object may include an icon or figure (e.g., an avatar) that represents a real user in a virtual world. In the metaverse, there may be numerous metaverse objects that are available for user engagement and/or control.

In exemplary embodiments, the aforementioned information in a given metaverse resource inventory 250i may include, for each relevant metaverse object, data regarding an identifier or ID of the metaverse object, a classification of the metaverse object (e.g., as a representation of a user (such as an avatar), as a resource usable by a user (such as a racecar in a game), etc.), location(s) of the metaverse object within the immersive environment (e.g., in 3D space identified using cartesian coordinates (x, y, and z)), a state of mobility of the metaverse object in the immersive environment (e.g., an avatar "walking" 2 meters per second in the metaverse, a racecar traveling at 100 kilometers per second in the metaverse, etc.), service-dependent geographic area(s) or location(s) (e.g., multi-access edge computing (MEC)

devices) where instances of the metaverse object (such as software resources and/or other metaverse object data) are stored and accessible, a community or communities (or "geo area(s)") with which the metaverse object is associated (e.g., a golfing community for a golfer avatar in a golfing game in the metaverse, a racing community for a racecar resource in a racing game in the metaverse, etc.), the minimum and/or recommended connection bandwidth or speed for experiencing the metaverse object, the "best" frame rate for experiencing the metaverse object, the minimum and/or recommended XR device (processing, memory, graphics, network communications, etc.) capabilities for experiencing the metaverse object, dimensions of the metaverse object and/or characteristics or other parameters associated with the metaverse object, the possible types of interactions with the metaverse object (e.g., gesture-based interactions, voice-based interactions, etc.), the type or theme of the metaverse object (e.g., for play, for entertainment, for education, etc.), the complexity or sophistication level of the metaverse object (e.g., for beginners, for intermediate-level users, for advanced users, etc.), the inputs that are accepted by the metaverse object (e.g., types of commands, types of requests, etc.), the outputs that the metaverse object may provide (e.g., video presentations, monetary rewards, lead-ins or triggers to join other immersions, etc.), and/or the like.

The metaverse 250 may be associated with one or more metaverse service providers. A given metaverse service provider may operate one or more immersion engine(s) (e.g., associated with one or more metaverse resource inventories 250$i$) that are implemented in server device(s) (not shown) and configured to provide functions or capabilities relating to facilitating and managing immersive environments or experiences for users. In various embodiments, an immersion engine may provide AR environments, VR environments, or a combination of both in the metaverse. Thus, metaverse services facilitated by the network system 200 can be purely virtual and/or can involve interactions between the virtual and physical worlds.

As a given immersive experience or environment may involve multiple metaverse objects and possibly those that correspond to users located in different geographic locations and using network connectivity provided by different network providers, aspects of the immersion or immersive environment (such as metaverse object data, associated object or immersive environment data (e.g., graphics, audio, etc.), software for providing the immersive environment or metaverse object data, etc.) may be hosted or stored in servers or computing devices that are generally local or regional to those users. For instance, a virtual racing game or party hosted in the metaverse 250 may include metaverse objects (e.g., racecars or avatars) that are associated with users in different countries and that are respectively hosted in or run on one or more edge systems/devices near the corresponding users. Thus, although not shown, in exemplary embodiments, the network system 200 may include any number of edge systems/devices associated with base stations of the access network(s) 210. In various embodiments, the base stations and corresponding edge systems may be associated with (e.g., respective) cells, such as heterogeneous cells (e.g., that provide access to the network system 200 using different types of RATs). In various embodiments, the cells can be terrestrial cells (e.g., one or more macrocells, small cells or microcells, Wi-Fi-based cell(s), or the like) or non-terrestrial cells (e.g., a flying cell, or drone cell, served by UAVs). The network system 200 can include various quantities of cells (e.g., primary cells and/or secondary cells), various quantities of base stations in a cell, and/or various types of base stations and/or cells. UEs 255 can be located within cell coverage areas of the network system 200, provided by cells associated with the base stations, and may travel amongst various ones of the cells.

In one or more embodiments, one or more of the edge systems may include MEC network(s) and compute device(s), which may be useful in reducing (e.g., minimizing) delays associated with provisioning of data or services to one or more (requesting) devices located proximate to (e.g., within a threshold distance from) the corresponding base station. In various embodiments, one or more of the edge systems may include a MEC Hub device and compute device(s) communicatively coupled to the MEC Hub device that function as controller(s) in respective heterogeneous cells. In certain embodiments, one or more of the MEC Hub device and/or the compute devices can additionally, or alternatively, function as a controller for non-terrestrial cells. In some embodiments, a MEC Hub device and compute devices can be communicatively coupled to one another via an interface, such as a wired and/or wireless interface (e.g., fiber cable(s), hybrid fiber-coaxial (HFC) cable(s), or the like). In some embodiments, a MEC Hub device can function as a centralized MEC node for the various cells.

In various embodiments, one or more (e.g., each) of the edge systems (e.g., a MEC Hub device and/or compute devices) can manage an inventory of associated base stations, and can store data relating to such base stations in a data structure (e.g., a database, an array, a linked list, a table, a tree, and/or the like). The data relating to a base station can include, for example, information regarding an identity of the base station (e.g., a physical cell identifier (PCI) or the like), a location of the base station, actual or estimated available bandwidth of the base station, throughput of the base station, etc. In various embodiments, for example, a MEC Hub device and/or compute devices can dynamically update entries in the data structure in real-time, or near real-time, as updated data relating to the associated base station is received.

In various embodiments, an edge system (e.g., a MEC Hub device and/or computing devices) can be controlled to obtain and store the aforementioned immersion- or immersive environment-related data (such as metaverse object data, associated object or immersive environment data (e.g., graphics, audio, etc.), software for providing the immersive environment or metaverse object data, etc.) as well as data relating to UEs 255 (such as information regarding an identity of the UE, a current location of the UE, current signal strength(s) of nearby access points as measured by the UE, a direction of movement of the UE, a speed of travel of the UE, physical layer properties of the UE, signal round trip times (RTT), etc.). In one or more embodiments, the edge systems can receive the various data from corresponding metaverse resource inventories 250$i$, immersion engine(s), and/or an associated base station. In various embodiments, a MEC Hub device and/or computing devices can be dynamically updated in real-time, or near real-time, as changes relating to an immersive environment, one of more metaverse objects, or a UE 255 are detected.

As shown in FIG. 2A, a metaverse intelligent controller (MIC) 250$m$ may have access to the metaverse resource inventories 250$i$. In various embodiments, the MIC 250$m$ may be associated with or operated by a network provider (e.g., a provider of the access network(s) 210, the transport network(s) 215, the core network(s) 220, and/or the H-SDN 240). The MIC 250$m$ may be implemented in one or more server devices that are capable of communicating with the metaverse resource inventories 250$i$ to retrieve data relating to immersive environments and/or metaverse objects in those immersive environments. As depicted, the MIC 250*m* may also be communicatively coupled with a metaverse service and physical world mapping and abstraction layer/system 248 (described in more detail below).

As depicted in FIG. 2A, the network system 200 may include an access network intelligent controller (AIC) 210*i* that interfaces the H-SDN 240 and the access network(s) 210. In various embodiments, the AIC 210*i* may be capable of providing real-time (or near real-time) microservices associated with the access network(s) 210, and may be leveraged to select the most appropriate access technology or technologies that meet the needs of metaverse services. As shown, the AIC 210*i* may include an infrastructure platform 211*s*, a network information database 211*b*, and various applications (xApps). The infrastructure platform 211*s* may provide control functions for managing or providing microservices relating to wireline-based network resources and wireless-based network resources. The network information database 211*b* may store information regarding the various wireline-based network resources and wireless-based network resources, load conditions associated with those resources, availability of those resources, and/or the like. In exemplary embodiments, the AIC 210*i* may be similar to a RAN intelligent controller (MC), but may include functionality for managing wireline-based network resources as well as wireless-based network resources. In this sense, the AIC 210*i* may thus operate as a "general" access network controller.

Although not shown, in certain embodiments, portion(s) of the access network(s) 210 may be, or may include, a virtual RAN (vRAN) (e.g., in an open-RAN (O-RAN) implementation) in which software is decoupled from hardware and implementation thereof is in accordance with principles of network function virtualization (NFV), where the control plane is separated from the data plane. In these embodiments, the vRAN may include a centralized set of baseband units located remotely from antennas and remote radio units, may be configured to share signaling amongst cells, and may provide control and service delivery optimization functions. Here, the AIC 210*i* may include a network service management platform and RIC functionality (e.g., implemented in the infrastructure platform 211*s*). For instance, the AIC 210*i* may include a first MC portion that is implemented, or otherwise incorporated, in the network service management platform, and may also include a second RIC portion having a centralized unit (CU) (e.g., a base station CU, such as a gNB CU or the like) that provides a CU applications layer as well as a CU control plane CU-CP and a CU user plane CU-UP. The particular functions performed by the two RIC portions can vary based on various criteria, including requirements of the network, and can also include redundancy and/or dynamic switching of functions (including functions described herein) between the two RIC portions. Additionally, the vRAN may include distributed units (DUs)—i.e., baseband units (e.g., base station DUs, such as gNB DUs or the like) configured to perform signal processing, UE scheduling, and/or the like, where each of DUs may be implemented as a virtual DU (vDU). Further, the vRAN may also include remote radio heads or remote units (RUs) for communicative coupling (e.g., via an air interface) with the UEs 255. The RUs, the DUs, and the CU may, by way of a fronthaul (e.g., having open standards, such as O-RAN standards or the like), a midhaul, and a backhaul (e.g., portion(s) of the transport network(s) 215), provide (e.g., controlled) connectivity between the UEs 255 and (e.g., portion(s) of) the core network(s) 220. The network service management platform and/or the first RIC portion may be operative at or in non-real-time; the second RIC portion and/or the CU may be operative at or in near-real-time; and the DUs, the RUs, and/or the UEs 255 may be operative at or in real-time. As the terms (and related terms) are used herein, real-time operations may occur over a span of fractions of a second up to a second (or the like), near-real-time operations may occur over the course of a few seconds (e.g., 1 to 5 seconds or the like), and non-real-time operations may occur over a time period that is greater than a few seconds (e.g., greater than 5 seconds or the like). The network service management platform may manage, or otherwise adapt, RIC behaviors and/or operations across one or more of the three time zones or timeframes described above (e.g., real-time, near-real-time, and non-real-time) on an individualized and/or collective basis. Such management or adaptation of RIC behaviors and/or operations may conform to one or more models or microservices (e.g., artificial intelligence (AI) models or microservices), as described herein. In turn, the MC portions may establish and/or modify policies and/or behaviors of respective CUs, DUs, and RUs in accordance with the model(s) or microservice(s). In this regard, the network service management platform may indirectly influence the behaviors and/or operations of CUs, DUs, and/or RUs via one or more of the RIC portions. The communication channels and/or links between the vRAN and the UEs 255 may include wireless links. For example, some or all of the UEs 255 may be mobile, and may therefore enter and/or exit a service or coverage area associated with the vRAN. Also, some of the UEs 255 may include non-mobile or stationary devices. The vRAN may thus include one or more routers, gateways, modems, cables, wires, and/or the like, and the communication channels and/or links between the vRAN and the non-mobile or stationary UEs 255 may include wired/wireline links, optical links, etc. In certain embodiments, the second RIC portion may store, execute, and/or deploy in or via an applications layer (e.g., the aforementioned CU applications layer), applications or microservices (e.g., xApps or the like) that are configured to control and manage the vRAN. The applications or microservices may relate to scheduler capacity optimization, coverage optimization, capacity optimization (including, for example, via interference mitigation), user quality optimization (including, for example, for an uplink (UL) and/or a downlink (DL)), radio connection management, mobility management, quality-of-service (QoS) management, interference management, and/or the like. One or more of the RIC portions may also be configured to execute, or otherwise deploy, models, such as AI (e.g., machine learning (ML)) models that, when executed in one or more containers, provide corresponding microservices. Deployment of a microservice, such as an AI model or microservice, in the RIC portion(s) may involve, or include, for example, executing or instantiating the AI model in one or more containers in the applications layer of the RIC (e.g., the aforementioned CU applications layer), such that the AI model processes inputs (e.g., received from other microservices running on the RIC and/or from various components of the vRAN, such as the CU-CP & CU-UP, the DUs, and/or the RUs) and provides outputs (e.g., to the other microservices and/or the various components of the vRAN), in accordance with the AI model, to control the overall operation of the vRAN. Examples of microservices provided by AI model(s) can include those relating to scheduler capacity optimization, coverage optimization, capacity optimization (including, for example, via interference mitigation), user quality optimization (including, for example, for the UL and/or the DL), telemetry, network traffic control and/or management, device admissions (e.g., UE admissions control), and/or the like.

As shown in FIG. 2A, the network system 200 may also include a transport network intelligent controller (TIC) 215i that interfaces the H-SDN 240 and the transport network(s) 215. In various embodiments, the TIC 215i may be capable of providing real-time (or near real-time) microservices associated with the transport network(s) 215, and may be leveraged to select the most appropriate transport network(s) or link(s) that meet the needs of metaverse services.

The TIC 215i may have a similar framework as the AIC 210i. For instance, as depicted, the TIC 215i may include an infrastructure platform 216s, a network information database 216b, and various applications (xApps). The infrastructure platform 216s may provide control functions for managing or providing microservices relating to the transport network(s) 215. The network information database 216b may store information regarding the various transport network(s) 215, load conditions associated with those network(s), availability of those network(s), and/or the like.

As shown in FIG. 2A, the network system 200 may also include a core network intelligent controller (CIC) 220i that interfaces the H-SDN 240 and the core network(s) 220. In various embodiments, the CIC 220i may be capable of providing real-time (or near real-time) microservices associated with the core network(s) 220 (which may include distributed cores), and may be leveraged to select the most appropriate core network(s) or instance(s) that meet the needs of metaverse services. In one or more embodiments, the CIC 220i may be configured with (e.g., operator specified or intended) policies and control functions for core network optimization and efficiency/flexibility and for managing quality of experience (QoE).

The CIC 220i may have a similar framework as the AIC 210i. For instance, as depicted, the CIC 220i may include an infrastructure platform 221s, a network information database 221b, and various applications (microservices) including AI functionality. The infrastructure platform 221s may provide control functions for managing or providing microservices relating to the core network(s) 220. The network information database 221b may store information regarding the various core network(s) 220, load conditions associated with those network(s), availability of those network(s), and/or the like. The CIC 220i may also include a CIC coordinator (CIC-Cor) configured to communicate with other CICs (not shown) as well as an AIC coordinator (AIC-Cor) configured to communicate with the AIC 210i. The AIC-Cor may facilitate service coordination between the CIC 220i and the AIC 210i as needed.

As shown in FIG. 2A, the H-SDN 240 may include a hybrid SDN controller (H-SDNc) 242, the H-SDO system 244, and the metaverse service and physical world mapping and abstraction layer/system 248. In various embodiments, the H-SDNc 242 may be capable of communicating with the AIC 210i, the TIC 215i, and/or the CIC 220i (e.g., via application programming interface (API) calls or the like) to obtain data regarding (e.g., the availability and the load conditions of) the resources in the various access network(s) 210, transport network(s) 215, and/or core network(s) 220. In one or more embodiments, the H-SDNc 242 may be capable of polling the AIC 210i, the TIC 215i, and/or the CIC 220i for the necessary data or may be notified of state changes or updates (e.g., based on load condition(s) or resource availability satisfying threshold(s)). In exemplary embodiments, the mapping and abstraction layer/system 248 may provide association/mapping between metaverse objects and physical world network resources, and may interact with the MIC 250m, the AIC 210i, the TIC 215i, the CIC 220i, the H-SDO 244, and/or the H-SDNc 242 to facilitate service instantiation and service/network resource chaining to meet the needs of requested metaverse services.

Figure 2B:
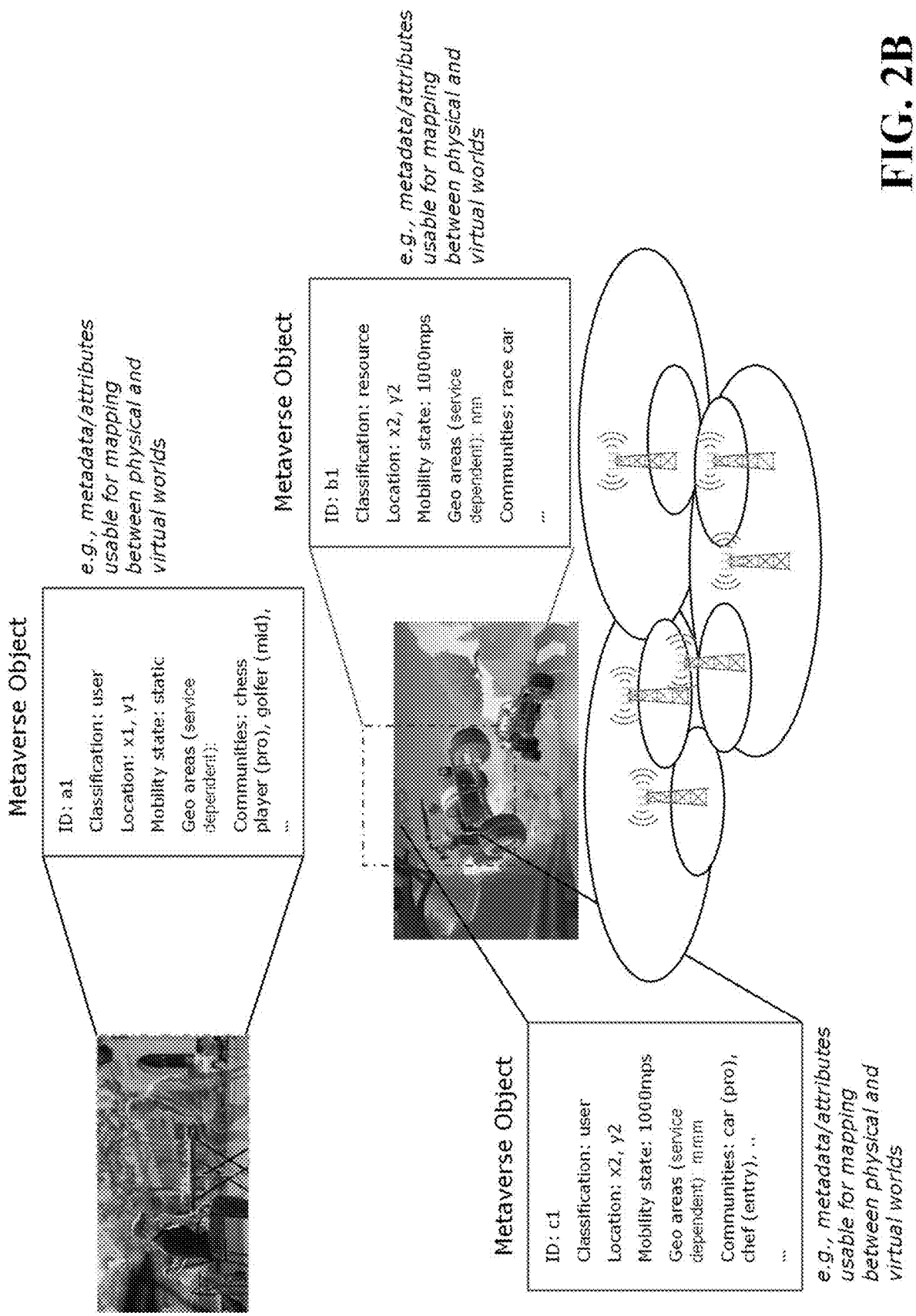
FIG. 2B is a diagram illustrating example metaverse object attributes for mapping or association with physical world resources in accordance with various aspects described herein.

A metaverse object (and/or its associated immersive environment) may have attributes that can be mapped to physical world attributes and/or resources. For instance, metaverse object attributes may identify properties of a metaverse object (e.g., that it is a resource, that it is an avatar, that it belongs to a "geo area" or "community," that it includes certain graphics, that it is data intensive, and so on), which can be mapped to resources or resource capabilities in the physical world. In one or more embodiments, the above-described information in a given metaverse resource inventory 250i may include attributes of a metaverse object that can be used in a mapping of the metaverse object with the physical world. For instance, a metaverse object's attributes may include data regarding an identifier or ID of the metaverse object, a classification of the metaverse object, location(s) of the metaverse object within the immersive environment, a state of mobility of the metaverse object in the immersive environment, service-dependent geographic area(s) or location(s) (e.g., MEC devices) where instances of the metaverse object (such as software resources and/or other metaverse object data) are stored and accessible, a community with which the metaverse object is associated, and so on. FIG. 2B shows example metaverse objects and their corresponding attributes that can be mapped to the physical world. As some examples, a racecar resource in the metaverse having a certain in-game speed (e.g., 200 meters per second) may be mapped to a corresponding real world speed (e.g., 50 kilometers per second), the racecar resource may be mapped to certain network/cell coverage regions of a wireless network and/or to particular RAN resources, a golfer avatar in the metaverse may be mapped to a golfing community, etc.

In one or more embodiments, the mapping and abstraction layer/system 248 may define or identify metaverse object attributes and derive mapping(s) thereof with the physical world based on predefined and/or learned rules. The rules may dictate analyses/comparisons of the metaverse object attributes and known information regarding physical world resources, such as, for example, the communication protocols associated with the resources, capabilities of the resources, services provided by the resources, operational limits associated with the resources, and/or the like. In some embodiments, mappings between metaverse objects and the physical world may be dynamic and/or service dependent. Combinations of different mappings can also be made between a given metaverse object and the physical world.

In certain embodiments, a metaverse object may be mapped with real world, service level agreement (SLA) requirement(s) or the like. For instance, a metaverse object's mobility state may be mapped with network bandwidth requirements—e.g., graphics resolution requirements may be higher for metaverse objects that are "moving" at high speeds in the metaverse, and thus network bandwidth may need to be higher to properly accommodate graphics content delivery relating to such fast movements. As another example, a metaverse object may be mapped to a particular minimum network latency, where a 5G RAN and core as well as a 5G slice may be needed to facilitate a metaverse service request associated with that metaverse object.

In one or more embodiments, a metaverse object (and/or its associated centralized or distributed software components) may be mapped to real world geographic locations, such as locations of MEC device(s) in which the metaverse object (and/or its associated centralized or distributed software components) are or may be stored. Where a given immersive environment is associated with multiple metaverse objects (e.g., multiple racecar resources in an immersive racing game) distributed across different geographic regions (e.g., stored/operating in MEC device(s) in different geographic areas, such as in different cities, different countries, etc.), each of the metaverse objects may be mapped to its corresponding MEC device(s) and/or to some or all of the MEC device(s) corresponding to the other metaverse objects. An immersive environment (e.g., game) and/or its corresponding metaverse objects (e.g., game objects, such as racecars, etc.) may thus be mappable to real world locations that provide users with coverage for the immersive environment so long as their respective UEs 255 are located in or near (e.g., within threshold distance(s) from) the coverage area(s).

In some embodiments, the mapping and abstraction layer/system 248 may identify or define a geo area (or community) that includes or encompasses some or all of the coverage areas provided by the various MEC device(s) that are hosting a given immersive environment and/or its corresponding metaverse objects, and may assign each of the metaverse objects of the immersive environment to that community. For instance, a virtual party held between multiple users across different cities in different countries may be associated with a community that corresponds to the coverage areas provided by the MEC device(s) in those different cities/countries that are hosting the metaverse objects and/or their associated centralized or distributed software components. As part of facilitating the provision of metaverse services, particular MEC device(s) may be selected or arranged to store/host a given metaverse object (and/or its associated centralized or distributed software components) so as to provide an overall "good" community that offers an optimal or improved immersive user experience. Here, one or more sets or instances of access, transport, and core network resources may be instantiated and combined to form a network resource composition for delivering a metaverse service relating to that metaverse object.

In various embodiments, the metaverse resource inventories 250i and/or associated immersion engines may be updated in real-time (or near real-time) as users operate or engage with relevant metaverse objects, connect to or disconnect from the immersive environment, and so on. The MIC 250m may provide such updates to the mapping and abstraction layer/system 248 accordingly, which can update/generate metaverse and physical world mappings in real-time (or near real-time).

In exemplary embodiments, the mapping and abstraction layer/system 248 may monitor the availability, conditions, and/or operations of the access network(s) 210, the transport network(s) 215, and/or the core network(s) 220 (e.g., by way of controlling and/or communicating with the AIC 210i, the TIC 215i, and/or the CIC 220i), and may provide abstractions of the resources of such network(s). In some embodiments, the mapping and abstraction layer/system 248 may, as part of its abstractions, leverage the universal resource ports 232 abstracted in the access network resource abstraction layer 230 and/or any universal resource ports that may be abstracted for the transport network(s) 215 and/or the core network(s) 220 in abstraction layer(s) similar to the abstraction layer 230.

In some embodiments, the mapping and abstraction layer/system 248 may similarly monitor the metaverse 250 to provide abstractions of resources in the metaverse 250. In certain embodiments, the mapping and abstraction layer/system 248 may, as part of its abstractions, leverage any universal resource ports that may be abstracted for the metaverse 250 in an abstraction layer similar to the abstraction layer 230. Resources in the metaverse 250 that can be abstracted include both logical and physical resources, such as the metaverse resource inventories 250i, metaverse objects, immersive environments, immersion engines, and other devices (e.g., edge devices) that store/operate on metaverse-related data.

In exemplary embodiments, the mapping and abstraction layer/system 248 may provide the aforementioned abstractions in the form of an abstraction bus, which facilitates determining of available (physical, virtual) resources and/or services provided by such resources, identifying of appropriate resources that can be utilized to satisfy requirement(s) of requested metaverse services, and chaining or stitching of instances of select resources (e.g., by establishing interconnections over standard interfaces) to deliver the metaverse services.

In this way, the mapping and abstraction layer/system 248 may, in one dimension (e.g., via communications with the AIC 210i, TIC 215i, CIC 220i), have a detailed overview of (e.g., all of) the real world network resources in the various underlying networks 210, 215, and 220, and may, in another dimension (e.g., via communications with the MIC 250m), have a detailed overview of the metaverse 250, which enables the mapping and abstraction layer/system 248 to provide detailed information for use with designing and configuring the optimal or best composition of physical and virtual world resources to facilitate metaverse services.

In one or more embodiments, the H-SDN 240 may allow the network system 200 to separate control plane operations from data plane operations, and may enable layer abstraction for separating service and network functions or elements from physical network functions or elements. In various embodiments, the H-SDN 240 may be communicatively coupled with a backend system (e.g., a backend customer service portal or the like) via which external systems (e.g., third-party immersion engines, such as gaming servers, video conferencing servers, etc.) may submit metaverse service request(s)/order(s) 252 associated with end users or devices (e.g., UEs 255). A metaverse service request 252 may identify metaverse object(s) and/or associated immersive environment(s), metaverse services and/or particular functionality, queries, or combinations thereof.

In exemplary embodiments, the H-SDO system 244 may be capable of performing service design and orchestration based on received metaverse service requests. The H-SDO system 244 may analyze a metaverse service request to determine functions and/or network data flows that are needed to facilitate delivery of the requested metaverse service. In various embodiments, the H-SDO system 244 may select/define a directed graph and/or an associated model that identifies features of the requested metaverse service. The H-SDO system 244 may generate metaverse service model(s) for the requested metaverse service in a programming language or format, such as Extensible Markup Language (XML), Yang models, other types of files, combinations thereof, or the like.

In one or more embodiments, the H-SDO system 244 may effect service creation/selection and composition of resources from both the metaverse and the physical world to satisfy the needs of a requested metaverse service. In certain embodiments, the H-SDO system 244 may design the chain of resources based on community objectives/intent, who users and/or their UEs 255 can meet or interact with, where users and/or their UEs 255 can interact with one another, the actions that users and/or their UEs 255 are permitted to perform, the immersive environment's application and service requirements/needs, and so on, some or all of which can be in accordance with predefined policies and/or user preferences. In some embodiments, the H-SDO system 244 may operate at the service level based on multiple metaverse inputs and outputs (MM-MIMO), where inputs may include both virtual objects (e.g., a metaverse conference) and physical resources and instances (e.g., telepresence, etc.), and where outputs may also relate to experiences in both the virtual and physical worlds (e.g., what a user sees, feels, or experiences).

In exemplary embodiments, the H-SDO system 244 may leverage the mapping and abstraction layer/system 248 to facilitate design and orchestration for metaverse services. In various embodiments, the H-SDO system 244 may interact with the mapping and abstraction layer/system 248 to obtain or identify (e.g., based on communications with the MIC 250m, based on prestored data, etc.) mappings for a given metaverse object (and/or its associated immersive environment) as well as to identify abstractions of the resources in the access network(s) 210, the transport network(s) 215, the core network(s) 220, and/or the metaverse 250 (e.g., immersion engines, etc.). The H-SDO system 244 may then identify sets or instances of the resources to chain or stitch together to deliver a requested metaverse service. For instance, the H-SDO system 244 may obtain and/or maintain information regarding abstracted network resources and metaverse resources, and utilize the information to identify and/or select available and accessible universal resource ports (e.g., ports 232 and/or the like) for a requested metaverse service. In one or more embodiments, the information may be represented in a descriptor table that defines the universal resource ports and that includes various data regarding the network/metaverse resources (e.g., each network/metaverse resource), such as a type of the resource, capabilities and/or attributes of the resource (e.g., bandwidth, frequency, or the like), a capacity or load of the resource, a status or condition (e.g., backhaul condition or the like) of the resource, etc.

In certain embodiments, the H-SDO system 244 may determine (e.g., using the descriptor objects provided by the access network abstraction layer 230) a model of the available resources in the access network(s) 210 and identify and select universal resource port(s) 232 corresponding to the resource(s) of these access network(s) 210 that are needed to support the metaverse service (e.g., as indicated in the abovementioned metaverse service model(s)). Additionally, where resources in the transport network(s) 215 and/or the core network(s) 220 are similarly abstracted (e.g., by the mapping and abstraction layer/system 248 and/or in layers similar to the abstraction layer 230) into universal resource ports, the H-SDO system 244 may additionally determine model(s) of the available resources in these networks and identify and select universal resource port(s) that correspond to the resource(s) of the transport network(s) 215 and/or core network(s) 220 that are needed to support the metaverse service (e.g., as indicated in the metaverse service model(s)). Further, where resources in the metaverse 250 are similarly abstracted (e.g., by the mapping and abstraction layer/system 248 and/or in a layer similar to the abstraction layer 230) into universal resource ports, the H-SDO system 244 may additionally determine model(s) of the available resources in the metaverse 250 and identify and select universal resource port(s) that correspond to the resource(s) of the metaverse 250 that are needed to support the metaverse service (e.g., as indicated in the abovementioned metaverse service model(s)). Based on some or all of the selected universal resource ports, the H-SDO system 244 may orchestrate connections of these universal resource ports (or associated services) to derive a low-cost (e.g., optimal or best) metaverse service path.

In this way, the H-SDO system 244 may, with access to resource abstractions and based on requested metaverse service definition(s), design and orchestrate metaverse service delivery for end consumers or enterprises using the most cost-effective resources across the access network(s) 210, the transport network(s) 215, the core network(s) 220, and the metaverse 250. In some embodiments, the H-SDO system 244 may also determine, and use, information regarding associated user priorities, extant network resource loadings, and/or the like to compose a requested metaverse service.

In various embodiments, the H-SDNc 242 may be similar to an SDN controller, but may be equipped with additional functionality for analyzing and/or managing resources in both the physical and the virtual worlds. In exemplary embodiments, the H-SDNc 242 may interact with individual network domain controllers—i.e., the AIC 210i, TIC 215i, the CIC 220i, and the MIC 250m—as well as with end devices (such as UEs 255, etc.) to deliver requested metaverse services. Based on these interactions, the H-SDNc 242 may be (e.g., continuously) informed on the availability and/or status of the metaverse communities, resources, objects, etc., and the physical world resources, such as wireline resources, wireless resources, RAN resources, core resources, transport resources, MEC resources, and/or the like. The H-SDNc 242 may be configured to leverage its "global view" of these various resources to instantiate selected resources (e.g., not only physical network resources, but also resources in the metaverse) and to "chain" the virtual communities and relevant resources together (with the proper distribution and interconnections) to facilitate a requested metaverse service. In exemplary embodiments, the H-SDNc 242 may provide, to the H-SDO system 244, information regarding its global view of the various resources (in both the physical and virtual worlds) so as to facilitate the above-described metaverse service design and orchestration in the H-SDO system 244. In various embodiments, the H-SDNc 242 may interact with the H-SDO system 244 to dynamically alter chains based on detected changes (or trigger conditions), such as a change in a virtual community, a change in a physical location of a UE 255, a change to interface equipment, and so on. Some or all of these changes may be detected by the AIC 210i, the TIC 215i, the CIC 220i, and/or the MIC 250m and reported to the H-SDNc 242 for any necessary responsive actions (e.g., shown as "network control" in FIG. 2A).

In exemplary embodiments, the H-SDO system 244 may request or instruct the H-SDNc 242 to derive (or stitch together) a designed metaverse service path. In various embodiments, the H-SDNc 242 may (e.g., as demanded by the H-SDO system 244) configure policies associated with an endpoint device (e.g., a UE associated with a user or enterprise), and may instantiate a route (or connection) between the selected universal resource ports—e.g., by chaining logical ports via the abstraction bus in the mapping and abstraction layer/system 248—to establish the networking between the selected universal resource ports so as to configure, or otherwise set up, the connections for metaverse service delivery. For example, the route may run between the selected universal resource ports across the access network(s) 210, the transport network(s) 215, the core network(s) 220, and/or the metaverse 250 to one or more endpoint access servers (e.g., immersion engines, etc.) associated with the requested metaverse service.

In this way, the H-SDNc 242 may coordinate with one or more of the AIC 210i, the TIC 215i, the CIC 220i, and the MIC 250m to ascertain the availability, status, and/or requirements of the portfolios of resources in the underlying networks and/or in the virtual world and effect dynamic, intelligent composition of metaverse service functions and associated interfaces (by instantiating routes and logical ports across the access network(s) 210, the transport network(s) 215, the core network(s) 220, and/or the metaverse 250) to derive a metaverse service instance for a requested metaverse service.

As an example, an external immersion engine or server may, based upon detecting a user's desire to engage in an immersive environment using a UE 255, submit a corresponding metaverse service (or provisioning) request 252 to the H-SDO system 244. Continuing the example, the request 252 may include a token containing information regarding the UE 255 (e.g., a unique identifier or the like), a desired metaverse service, a customer account associated with the user or the UE 255, metaverse service requirements and/or an SLA associated with the user, and/or the like. Further continuing the example, the H-SDO system 244 may receive and analyze the metaverse service request 252, and based on result(s) of the analysis (e.g., the determined type of metaverse service needed, requirement(s) of the metaverse service, and/or the like), identify select universal resources of the access network(s) 210, the transport network(s) 215, the core network(s) 220, and/or the metaverse 250 that can be used to provide the metaverse service for the user. Here, the H-SDO system 244 may (e.g., based on metaverse-to-physical world mappings provided by the mapping and abstraction layer 248 and/or based on other data) identify metaverse object attributes, quality-of-service (QoS) and/or SLA requirements (e.g., relating to latency, transmission speed, transmission frequency, routing, the uplink/downlink, quality of service class identifier (QCI), and/or the like), a location of the UE 255, and so on, and may (e.g., based on the abstraction bus in the mapping and abstraction layer 248) select universal resources from one or more of the access network(s) 210, the transport network(s) 215, the core network(s) 220, and/or the metaverse 250 to be chained or stitched to ultimately deliver the metaverse service. For instance, the H-SDO system 244 may determine that a particular MEC device located within a threshold distance from the UE 255 to be the appropriate resource to store software components of the immersive environment associated with the metaverse service, that a 5G RAN is needed to satisfy QoS requirements (which a 4G RAN is unable to satisfy), that a certain minimum transport network speed is required for proper metaverse object graphics data delivery (e.g., and thus a microwave wireless-based transport network is preferred over a fiber-based one), that a core should be instantiated, that a network slice should be instantiated (across the access network, transport network, and core network), and/or the like. Further continuing the example, a corresponding app service may be created using the selected universal resources and connected to a data plane (e.g., a UPF or the like) to provision the UE 255, such that, when the UE 255 begins facilitating the immersive environment, the metaverse service is provided to the UE 255 (e.g., as a metaverse service endpoint) via the selected universal resources and the data plane. In this way, the H-SDO system 244 may provide an E2E network path in the physical world that connects the UE 255 to the metaverse 250 in an application layer facilitated over the path.

In some embodiments, one or more of the AIC 210i, the TIC 215i, the CIC 220i, and the MIC 250m may assist in the tailoring of metaverse services and user experiences. For instance, one or more of the AIC 210i, the TIC 215i, the CIC 220i, and the MIC 250m may (e.g., based on an analysis of the availability, status, etc. of its managed resources and based on the requirements of a requested metaverse service) generate suggested or recommendation resources to employ in the chain of resources and provide the suggestions to the H-SDNc 242 and/or the H-SDO system 244 for consideration as part of metaverse service design, orchestration, and resource chaining.

In one or more embodiments, the H-SDO system 244 may utilize the abovementioned token in a metaverse service request to set policies for the end user device and provision the selected core network(s) 220 with data regarding the end user device, such that when the end user device attaches to the selected access network(s) 210, the end user device has the appropriate rights and/or permissions to use the provisioned metaverse service. Based on the provisioning, the selected core network(s) 220 may provide the end user device with information regarding service point connections (e.g., to one or more UPFs or the like in the core infrastructure system architecture).

In one or more embodiments, the H-SDNc 242 may additionally coordinate networking and provisioning of applications and/or services. The H-SDNc 242 may manage transport functions for various layers within the network system 200, and may access application functions for layers above the network system 200. The H-SDNc 242 may provide a platform for network services, network control of service instantiation and management, as well as a programmable environment for resource and traffic management. The H-SDNc 242 may also permit a combination of real-time data transfers for the service and network elements with real-time, or near real-time, control of a forwarding plane. In various embodiments, the H-SDNc 242 may facilitate flow set up in real-time, network programmability, network extensibility, connections via standard interfaces, and/or multi-vendor support. In some embodiments, interactions between layers of the network system 200 can be based upon policies, which can aid in determining an optimal (or best) configuration of the network system 200 as well as aid in rapid adaptation of the network system 200 in response to changing state and changing customer requirements—e.g., predicted demand, addition of new users, spikes in traffic, planned and unplanned network outages, adding new services, and/or maintenance. In certain embodiments, the H-SDNc 242 may also be capable of constructing instances of functions based on requested metaverse service needs. For example, in a case where a requested metaverse service includes a security attribute, the H-SDNc 242 may construct a firewall (e.g., a dedicated or shared instance) for the requested metaverse service.

Although not shown, in various embodiments, the H-SDN 240 may additionally include a detection and service healing (DSH) element. In various embodiments, the DSH element may monitor the network resources (e.g., for performance, for faults, for QoS purposes (e.g., relating to latency, transmission speed, transmission frequency, routing, the uplink/downlink, QCI, etc.), and/or the like) and provide reports on the network resources (e.g., operational status/health reports or the like) to the H-SDO system 244 to facilitate metaverse service design, composition, and orchestration. In one or more embodiments, the DSH element may obtain (e.g., based on the monitoring) information regarding network resource performance and/or faults from the access network resource abstraction layer 230 (for the access network(s) 210) and/or similar abstraction layers (for the transport network(s) 215 and core network(s) 220).

In some embodiments, the DSH element may obtain fault definitions provided by the H-SDO system 244, which may identify threshold(s) associated with certain data regarding the network resource(s) that the DSH element is to monitor and report on. As an example, a fault definition may include a threshold loading capacity for a network resource, such as a 5G millimeter wave (mmW) access point. In some embodiments, the DSH element may, based on monitoring data regarding a particular network resource, determine whether a parameter of the particular network resource satisfies a threshold (e.g., exceeds the threshold). In a case where the DSH element determines that the parameter satisfies the threshold, the DSH element may provide a corresponding report to the H-SDO system 244, which the H-SDO system 244 may utilize to determine whether the particular network resource should be included in a set of network resources for supporting a requested metaverse service. In a case where a service path has already been established by the H-SDO system 244 and/or the H-SDNc 242, and where the DSH element determines that a certain network resource, included in the service path, satisfies a certain threshold (which may, for example, relate to an object or requirement of the metaverse service), the DSH element may provide a report on performance of the service associated with the certain network resource and/or submit a request to the H-SDO system 244 to repair the metaverse service composition or generate a new metaverse service composition. In such cases, the H-SDO system 244 may recalculate, or redetermine, a metaverse service composition that excludes the non-performant network resource, and cause an adjusted service path to be instantiated. For example, in a case where the H-SDO system 244 determines, based on a report provided by the DSH element that a base station (e.g., in the access network(s) 210) has failed, is overloaded, or is underperforming, and where the H-SDO system 244 identifies an available Wi-Fi access point that a UE (e.g., a UE 255) associated with the metaverse service is within communicable range of, the H-SDO system 244 may reinstantiate the service path to exclude the base station and include the Wi-Fi access point. In various embodiments, the H-SDO system 244 may exclude or replace other network resource(s) in a re-determined metaverse service composition (e.g., even those network resources that might not be underperforming) if the H-SDO system 244 determines that not doing so might result in system latencies, breaches of rules between the some or all of the network resources in the current metaverse service composition, and/or the like.

By providing analytic outputs or the like to the H-SDO system 244, the DSH element enables the H-SDO system 244 to dynamically adjust service paths, and thereby facilitates ongoing, proactive self-management of a metaverse service, which improves overall end user experience. Performing load balancing and maximizing use of an entirety of the access network(s) 210, the transport network(s) 215, and the core network(s) 220 as part of such self-management can also improve overall network performance. Furthermore, resource abstraction into individual universal resources that are accessible, connectable, and/or stitchable (e.g., based on requested metaverse service needs) enables facilitation of metaverse services for users.

It is to be appreciated and understood that some or all of the functions described as being performed by a particular device or component of the network system 200 may additionally, or alternatively, be performed by one or more other devices or components of the network system 200. For instance, some or all of the functions described as being performed by the AIC 210i may additionally, or alternatively, be performed by one or more of the TIC 215i, the CIC 220i, the H-SDN 240, the H-SDNc 242, the H-SDO system 244, the mapping and abstraction layer/system 248, the MIC 250m, etc. As another example, some or all of the functions described as being performed by the H-SDO system 244 may additionally, or alternatively, be performed by one or more of the H-SDN 240, the H-SDNc 242, the mapping and abstraction layer/system 248, the MIC 250m, the AIC 210i, the TIC 215i, the CIC 220i, etc. As a further example, some or all of the functions described as being performed by the H-SDNc 242 may additionally, or alternatively, be performed by one or more of the H-SDN 240, the H-SDO system 244, the mapping and abstraction layer/system 248, the MIC 250m, etc., and so on.

Further, as described above, the H-SDO system 244 may be capable of dynamically altering chains based on detected changes (or trigger conditions). In certain embodiments, the H-SDO system 244 and/or the H-SDNc 242 may, subsequent to designing and chaining resources for a given UE 255, monitor (e.g., via the AIC 210i, the TIC 215i, and/or the CIC 220i) the UE 255's location (e.g., based on global positioning system (GPS) data, based on data provided by base station(s), and/or the like), and perform additional actions relating to the chaining. For instance, in one or more embodiments, the H-SDO system 244 and/or the H-SDNc 242 may, based upon detecting that the UE 255 is relocating from an indoor location with high-capacity Wi-Fi network coverage to an outdoor location with only 4G or 5G network coverage, perform one or more actions, such as causing a message to be transmitted to and presented on the UE 255 to notify the user of expected performance issues, re-assessing the available network resources and metaverse resources to identify any changes that can be made (e.g., selection of a different access network resource, transport network resource, or core network resource, instantiation of a network slice, etc.), instructing the MIC 250m to retrieve and provide an alternative (e.g., lower resolution or less resource intensive) version of the metaverse object or immersive environment for the UE 255, and/or the like.

In various embodiments, one or more of the H-SDO system 244, the H-SDNc 242, the mapping and abstraction layer/system 248, and the MIC 250m may employ AI (e.g., ML algorithm(s)) as part of any of their functions described herein. For instance, one or more of the H-SDO system 244, the H-SDNc 242, the mapping and abstraction layer/system 248, and the MIC 250m may employ ML techniques to train model(s) for deriving the above-described associations/mappings between the physical and virtual worlds. As another example, one or more of the H-SDO system 244 and the H-SDNc 242 may train model(s) that predict how to design an optimal (best) chain and/or how to actually chain network resources and metaverse resources for metaverse services. As a further example, one or more of the H-SDO system 244, the H-SDNc 242, the mapping and abstraction layer/system 248, and the MIC 250m may train model(s) that predict the appropriate action(s) to take (e.g., altering a chain, notifying a user, requesting a lower/higher resolution of an immersive environment to be provided to the user, etc.) based on UE 255 movement, time of day, network load, and/or the like. For instance, one or more ML algorithms may be trained to provide predictive function(s) configured to predict user behavior and/or future events. Here, certain user behavior(s) and/or event(s) may be mapped to network resource(s) that are capable of performing certain action(s) that provide an optimal user experience in accordance with the user behavior(s) and/or event(s)—e.g., when a user behaves in a predefined manner or an event is predicted to occur (e.g., within a threshold time, within a threshold distance from the user, and/or the like), the action(s) may be performed to facilitate improved user experience. In various embodiments, the AI or ML algorithm(s) may be configured to reduce any error in the derivations of associations/mappings, predictions of optimal (best) chains, appropriate action(s) to take, and so on. In this way, any error that may be present may be provided as feedback to the algorithm(s), such that the error may tend to converge toward zero as the algorithm(s) are utilized more and more.

It is also to be appreciated and understood that the quantity and arrangement of networks, resources, resource abstractions, ports, software-defined networks, software-defined network components, databases, systems, controllers, apps, microservices, and coordinators shown in FIG. 2A are provided as an example. In practice, there may be additional networks, resources, resource abstractions, ports, software-defined networks, software-defined network components, databases, systems, controllers, apps, microservices, and/or coordinators, fewer networks, resources, resource abstractions, ports, software-defined networks, software-defined network components, databases, systems, controllers, apps, microservices, and/or coordinators, different networks, resources, resource abstractions, ports, software-defined networks, software-defined network components, databases, systems, controllers, apps, microservices, and/or coordinators, or differently arranged networks, resources, resource abstractions, ports, software-defined networks, software-defined network components, databases, systems, controllers, apps, microservices, and/or coordinators than those shown in FIG. 2A. For example, the network system 200 can include more or fewer networks, resources, resource abstractions, ports, software-defined networks, software-defined network components, databases, systems, controllers, apps, microservices, and/or coordinators, etc. In practice, therefore, there can be hundreds, thousands, millions, billions, etc. of such networks, resources, resource abstractions, ports, software-defined networks, software-defined network components, databases, systems, controllers, apps, microservices, and/or coordinators. In this way, example system 200 can coordinate, or operate in conjunction with, a set of networks, resources, resource abstractions, ports, software-defined networks, software-defined network components, databases, systems, controllers, apps, microservices, and/or coordinators and/or operate on data sets that cannot be managed manually or objectively by a human actor. Furthermore, two or more networks, resources, resource abstractions, ports, software-defined networks, software-defined network components, databases, systems, controllers, apps, microservices, and/or coordinators shown in FIG. 2A may be implemented within a single network, resource, resource abstraction, port, software-defined network, software-defined network component, database, system, controller, app, microservice, or coordinator, or a single network, resource, resource abstraction, port, software-defined network, software-defined network component, database, system, controller, app, microservice, or coordinator shown in FIG. 2A may be implemented as multiple networks, resources, resource abstractions, ports, software-defined networks, software-defined network components, databases, systems, controllers, apps, microservices, or coordinators. Additionally, or alternatively, a set of networks, resources, resource abstractions, ports, software-defined networks, software-defined network components, databases, systems, controllers, apps, microservices, or coordinators of the network system 200 may perform one or more functions described as being performed by another set of networks, resources, resource abstractions, ports, software-defined networks, software-defined network components, databases, systems, controllers, apps, microservices, or coordinators of the network system 200.

It is further to be understood and appreciated that, although FIG. 2A is described above as pertaining to various processes and/or actions that are performed in a particular order, some of these processes and/or actions may occur in different orders and/or concurrently with other processes and/or actions from what is depicted and described above. Moreover, not all of these processes and/or actions may be required to implement the systems and/or methods described herein.

In various embodiments, threshold(s) may be utilized as part of determining/identifying one or more actions to be taken or engaged. The threshold(s) may be adaptive based on an occurrence of one or more events or satisfaction of one or more conditions (or, analogously, in an absence of an occurrence of one or more events or in an absence of satisfaction of one or more conditions).

Figure 2C:
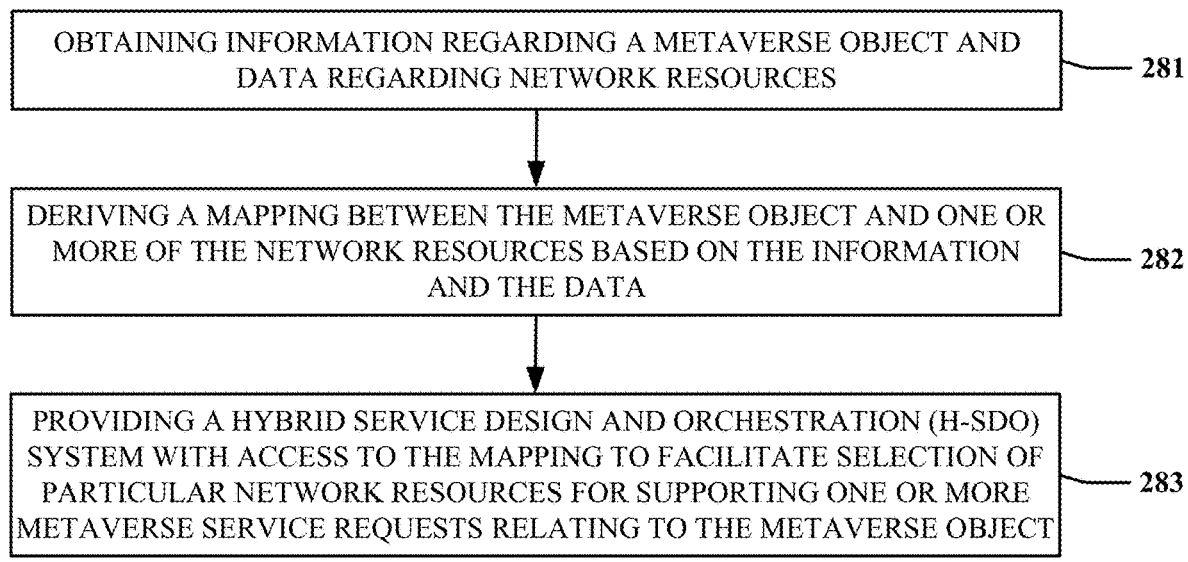
FIG. 2C depicts an illustrative embodiment of a method in accordance with various aspects described herein.

FIG. 2C depicts an illustrative embodiment of a method 280 in accordance with various aspects described herein. In some embodiments, one or more process blocks of FIG. 2C can be performed by a mapping system, such as the mapping and abstraction layer/system 248.

At 281, the method can include obtaining information regarding a metaverse object and data regarding network resources. For example, the mapping and abstraction layer/system 248 can, similar to that described elsewhere herein, perform one or more operations that include obtaining information regarding a metaverse object and data regarding network resources.

At 282, the method can include deriving a mapping between the metaverse object and one or more of the network resources based on the information and the data. For example, the mapping and abstraction layer/system 248 can, similar to that described elsewhere herein, perform one or more operations that include deriving a mapping between the metaverse object and one or more of the network resources based on the information and the data.

At 283, the method can include providing a hybrid service design and orchestration (H-SDO) system with access to the mapping to facilitate selection of particular network resources for supporting one or more metaverse service requests relating to the metaverse object. For example, the mapping and abstraction layer/system 248 can, similar to that described elsewhere herein, perform one or more operations that include providing a hybrid service design and orchestration (H-SDO) system with access to the mapping to facilitate selection of particular network resources for supporting one or more metaverse service requests relating to the metaverse object.

In some implementations of these embodiments, the deriving the mapping comprises analyzing and comparing the information and the data based on one or more rules or models.

In some implementations of these embodiments, the processing system comprises a metaverse service and physical world mapping and abstraction layer that is configured to provide the mapping.

In some implementations of these embodiments, the data identifies a current availability of one or more of the network resources, a load condition of one or more of the network resources, or a combination thereof.

In some implementations of these embodiments, the data identifies a communication protocol associated with one or more of the network resources, capabilities of one or more of the network resources, services provided by one or more of the network resources, or a combination thereof.

In some implementations of these embodiments, the data identifies an operating status of one or more of the network resources, operational limits associated with one or more of the network resources, or a combination thereof.

In some implementations of these embodiments, the information specifies an identifier or ID of the metaverse object, a classification of the metaverse object, or a combination thereof.

In some implementations of these embodiments, the information identifies a location of the metaverse object within an immersive environment.

In some implementations of these embodiments, the information identifies a state of mobility of the metaverse object in an immersive environment.

In some implementations of these embodiments, the information identifies a service-dependent geographic area or location where an instance of the metaverse object is stored.

In some implementations of these embodiments, the information identifies a community with which the metaverse object is associated.

In some implementations of these embodiments, the information identifies a minimum or recommended connection bandwidth or speed for experiencing the metaverse object.

In some implementations of these embodiments, the obtaining the information comprises obtaining the information from one or more metaverse resource inventories, one or more immersion engines, or a combination thereof.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2D:
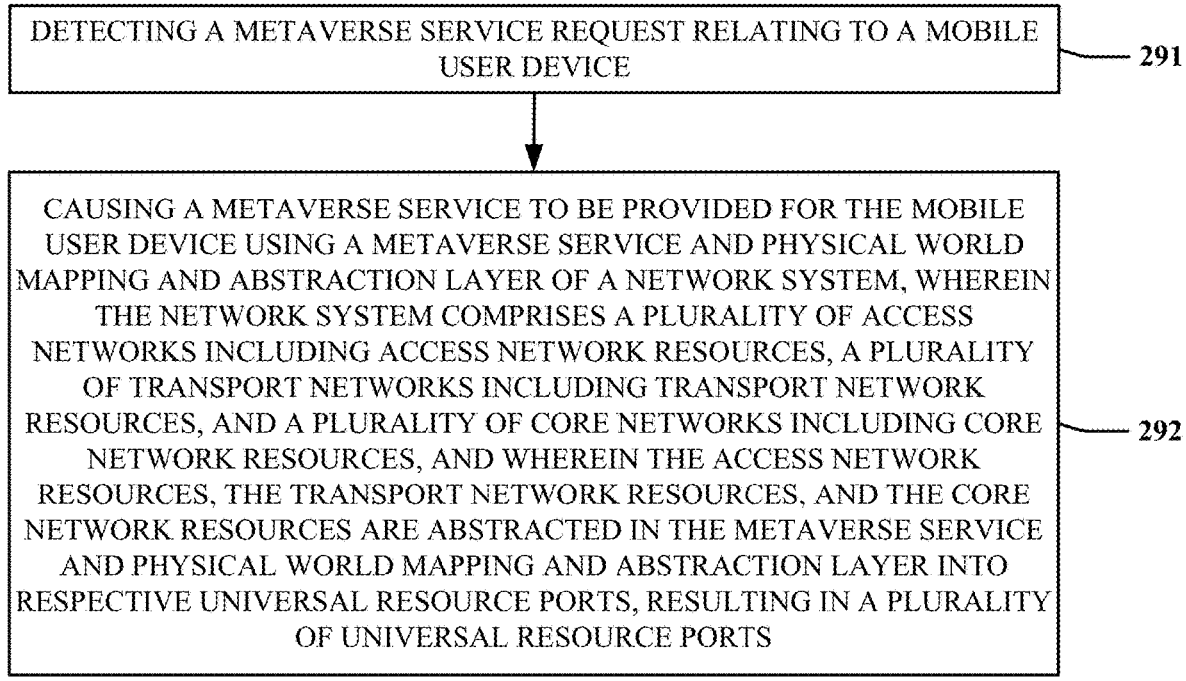
FIG. 2D depicts an illustrative embodiment of a method in accordance with various aspects described herein.

FIG. 2D depicts an illustrative embodiment of a method 290 in accordance with various aspects described herein. In some embodiments, one or more process blocks of FIG. 2D can be performed by an H-SDO system and/or an H-SDNc, such as the H-SDO system 244 and/or the H-SDNc 242.

At 291, the method can include detecting a metaverse service request relating to a mobile user device. For example, the H-SDO system 244 and/or the H-SDNc 242 can, similar to that described elsewhere herein, perform one or more operations that include detecting a metaverse service request relating to a mobile user device.

At 292, the method can include causing a metaverse service to be provided for the mobile user device using a metaverse service and physical world mapping and abstraction layer of a network system, wherein the network system comprises a plurality of access networks including access network resources, a plurality of transport networks including transport network resources, and a plurality of core networks including core network resources, and wherein the access network resources, the transport network resources, and the core network resources are abstracted in the metaverse service and physical world mapping and abstraction layer into respective universal resource ports, resulting in a plurality of universal resource ports. For example, the H-SDO system 244 and/or the H-SDNc 242 can, similar to that described elsewhere herein, perform one or more operations that include causing a metaverse service to be provided for the mobile user device using a metaverse service and physical world mapping and abstraction layer of a network system, wherein the network system comprises a plurality of access networks including access network resources, a plurality of transport networks including transport network resources, and a plurality of core networks including core network resources, and wherein the access network resources, the transport network resources, and the core network resources are abstracted in the metaverse service and physical world mapping and abstraction layer into respective universal resource ports, resulting in a plurality of universal resource ports.

In some implementations of these embodiments, the causing the metaverse service to be provided for the mobile user device involves identifying requirements of the metaverse service request, identifying particular universal resource ports of the plurality of universal resource ports whose corresponding resources are capable of satisfying the requirements, and stitching the particular universal resource ports together.

In some implementations of these embodiments, the network system comprises an access network intelligent controller (AIC) configured to manage the plurality of access networks and provide information regarding the plurality of access networks.

In some implementations of these embodiments, the network system comprises a transport network intelligent controller (TIC) configured to manage the plurality of transport networks and provide information regarding the plurality of transport networks.

In some implementations of these embodiments, the network system comprises a core network intelligent controller (CIC) configured to manage the plurality of core networks and provide information regarding the plurality of core networks.

In some implementations of these embodiments, the network system comprises a metaverse intelligent controller (MIC) configured to provide information regarding metaverse resources. In some implementations of these embodiments, the metaverse resources comprise logical resources and physical resources. In some implementations of these embodiments, the logical resources and physical resources include one or more metaverse objects, one or more immersive environments associated with the one or more metaverse objects, one or more immersion engines that provide the one or more immersive environments, one or more edge devices that operate on data associated with the one or more metaverse objects, or combinations thereof.

In some implementations of these embodiments, the plurality of access networks comprises one or more wireline-based access networks and one or more wireless-based access networks.

In some implementations of these embodiments, the plurality of transport networks comprises one or more wireline-based transport networks and one or more wireless-based transport networks.

In some implementations of these embodiments, the plurality of core networks comprises one or more wireline-based core networks and one or more wireless-based core networks.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
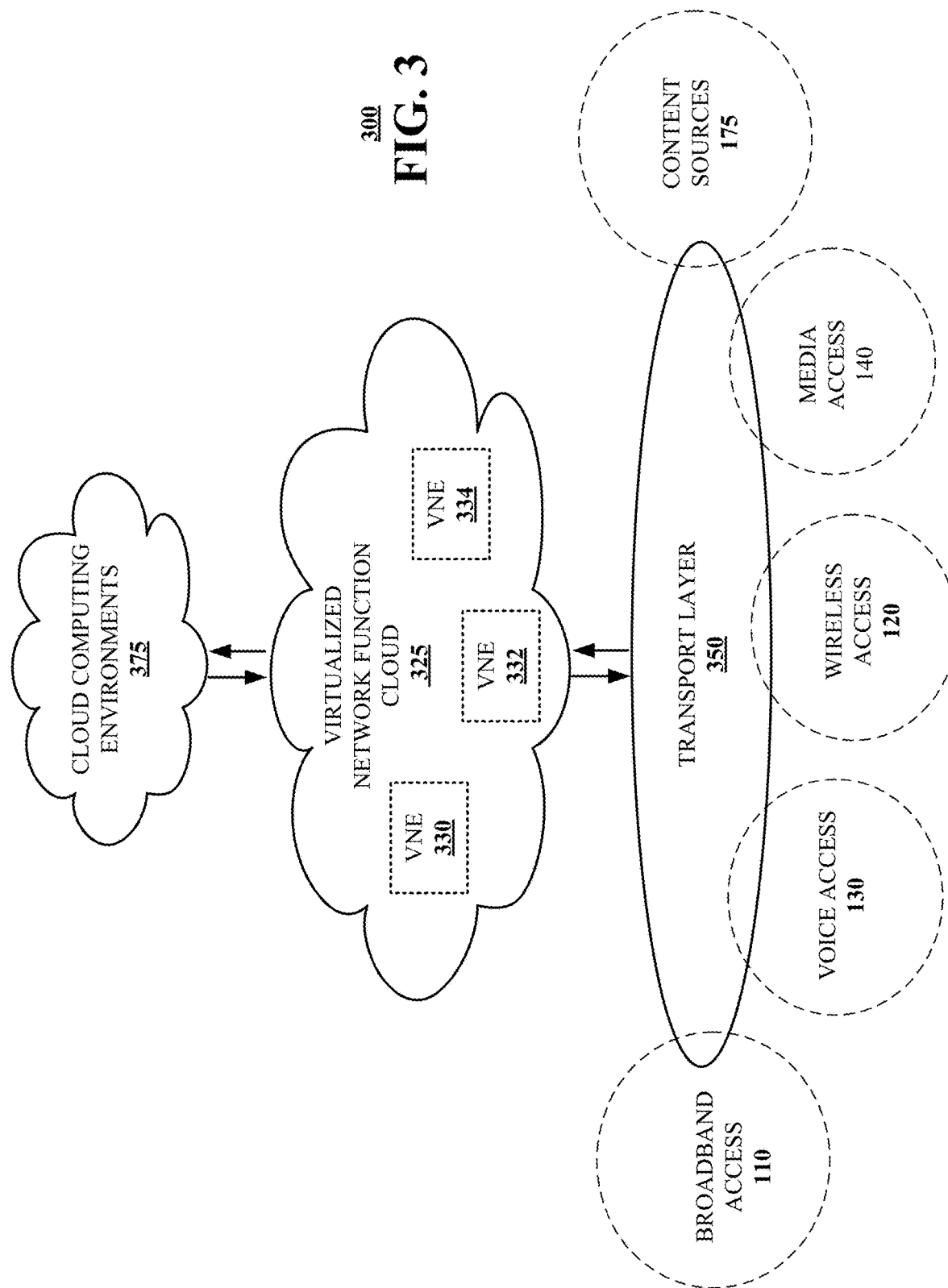
FIG. 3 is a block diagram illustrating an example, non-limiting embodiment of a virtualized communications network in accordance with various aspects described herein.

Referring now to FIG. 3, a block diagram 300 is shown illustrating an example, non-limiting embodiment of a virtualized communications network in accordance with various aspects described herein. In particular, a virtualized communications network is presented that can be used to implement some or all of the subsystems and functions of system 100, the subsystems and functions of system 200, and methods 280 and 290 presented in FIGS. 1, 2A, 2C, and 2D. For example, the virtualized communications network 300 can facilitate mapping/associating of metaverse objects with the physical world, such as physical/logical network resources (e.g., access network resources, transport network resources, and/or core network resources) and/or their capabilities. As another example, the virtualized communications network 300 can include, provide, or be used with, in whole or in part, a metaverse service-based E2E network architecture in which both physical world resources and virtual world (metaverse-related) resources are abstracted as selectable universal resource ports and where metaverse services are delivered via dynamic, intelligent composition of functions and interfaces using select ones of the universal resource ports.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communications network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so, the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and which creates an overall elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
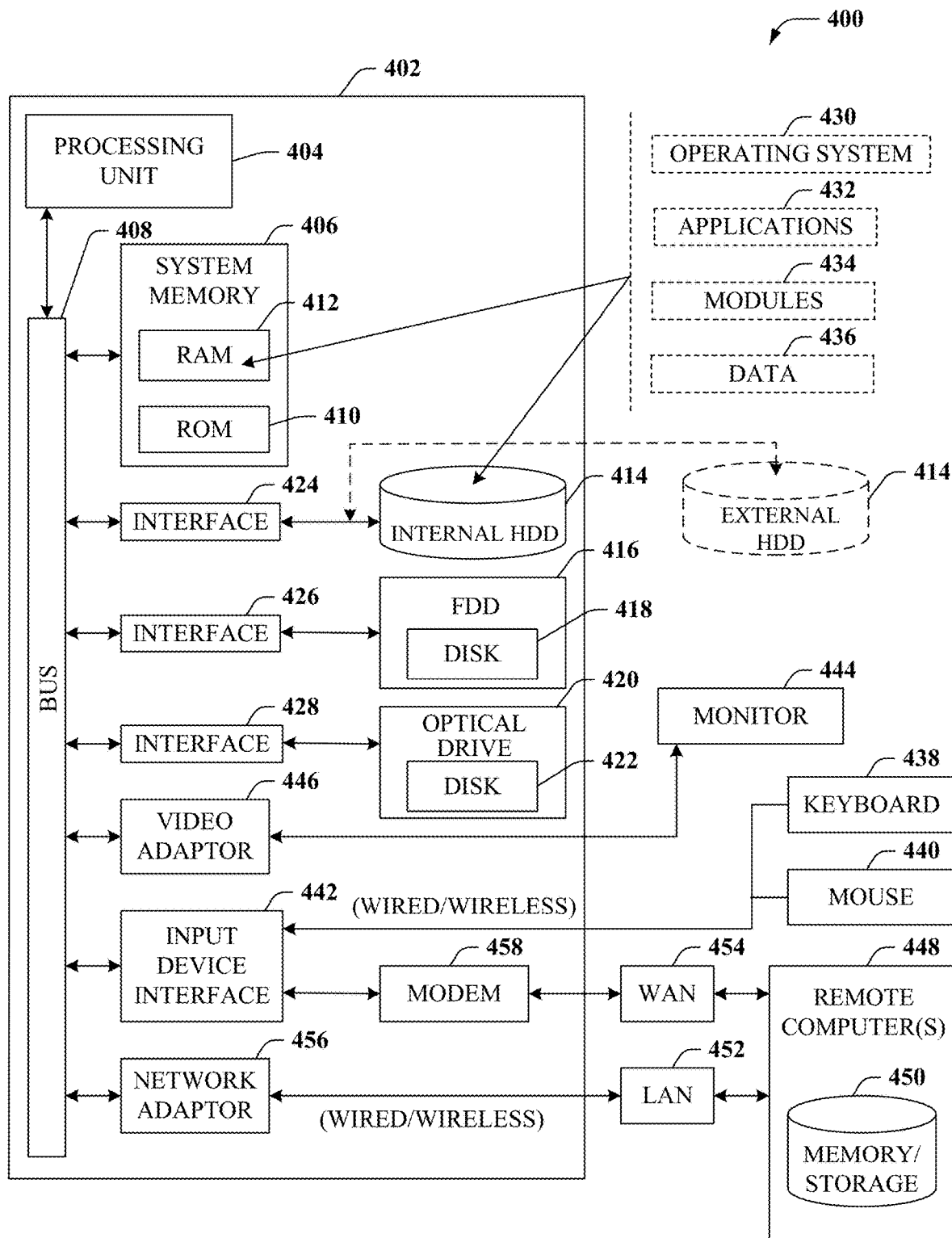
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, the computing environment 400 can facilitate mapping/associating of metaverse objects with the physical world, such as physical/logical network resources (e.g., access network resources, transport network resources, and/or core network resources) and/or their capabilities. As another example, the computing environment 400 can include, provide, or be used with, in whole or in part, a metaverse service-based E2E network architecture in which both physical world resources and virtual world (metaverse-related) resources are abstracted as selectable universal resource ports and where metaverse services are delivered via dynamic, intelligent composition of functions and interfaces using select ones of the universal resource ports.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM),flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communications network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
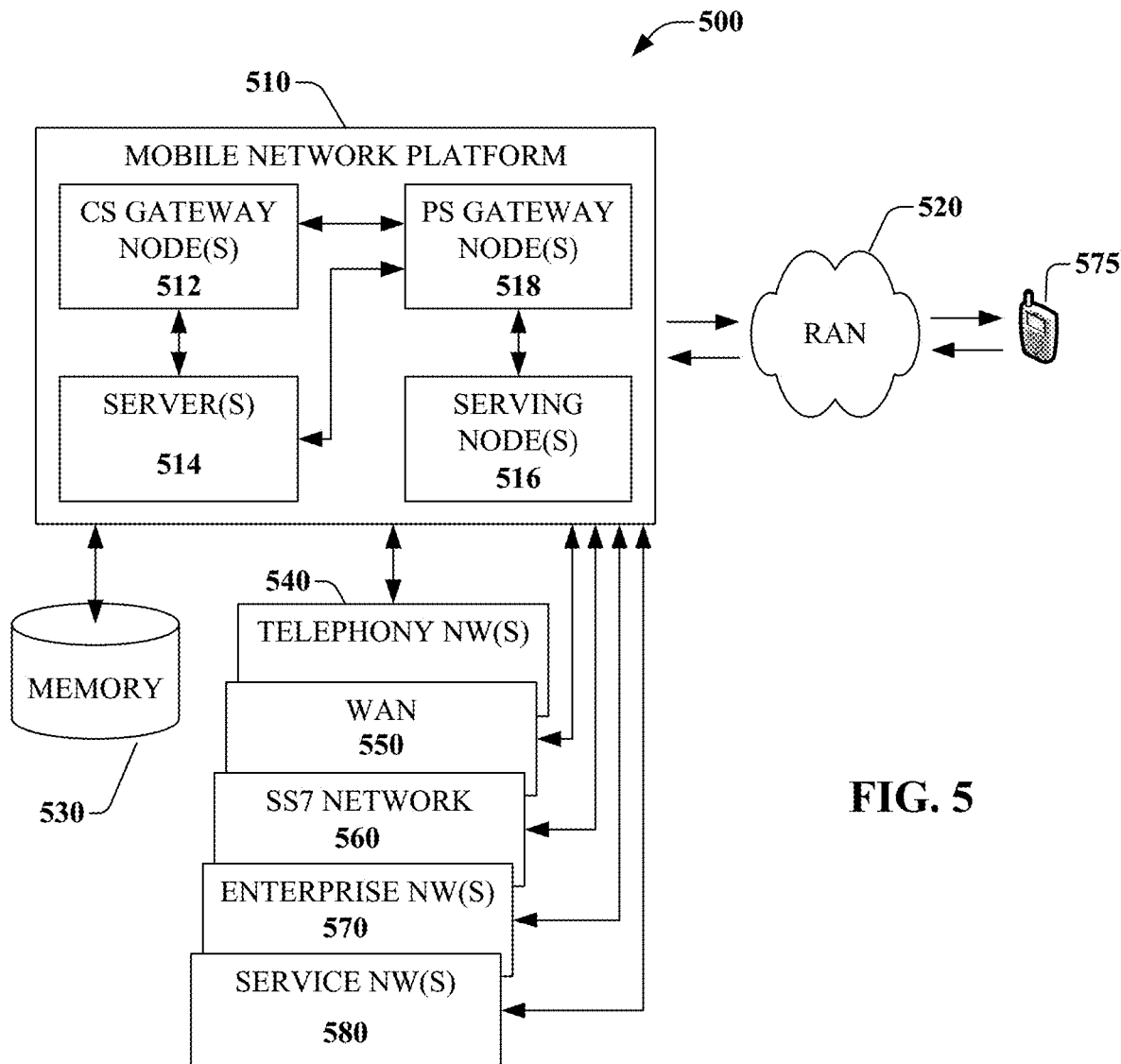
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, the platform 510 can facilitate mapping/associating of metaverse objects with the physical world, such as physical/logical network resources (e.g., access network resources, transport network resources, and/or core network resources) and/or their capabilities. As another example, the platform 510 can include, provide, or be used with, in whole or in part, a metaverse service-based E2E network architecture in which both physical world resources and virtual world (metaverse-related) resources are abstracted as selectable universal resource ports and where metaverse services are delivered via dynamic, intelligent composition of functions and interfaces using select ones of the universal resource ports. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as distributed antenna networks that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
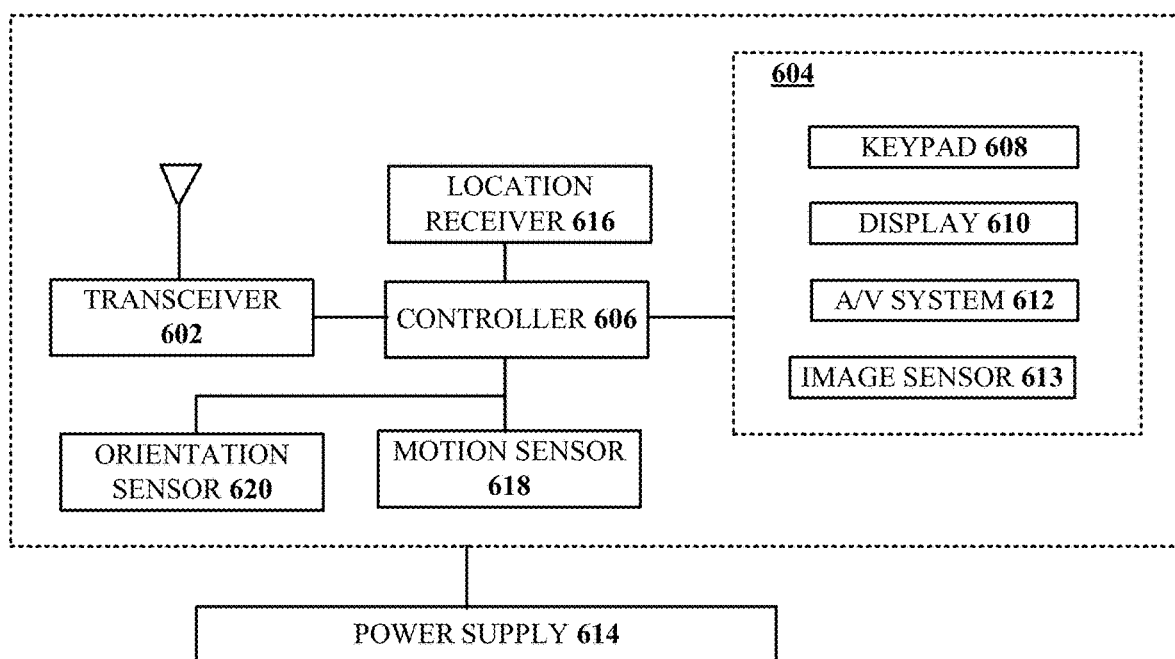
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via communications network 125. For example, the computing device 600 can facilitate mapping/associating of metaverse objects with the physical world, such as physical/logical network resources (e.g., access network resources, transport network resources, and/or core network resources) and/or their capabilities. As another example, the computing device 600 can include, provide, or be used with, in whole or in part, a metaverse service-based E2E network architecture in which both physical world resources and virtual world (metaverse-related) resources are abstracted as selectable universal resource ports and where metaverse services are delivered via dynamic, intelligent composition of functions and interfaces using select ones of the universal resource ports.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communications network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communications network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
obtaining information regarding a metaverse object and data regarding network resources;
deriving a mapping between the metaverse object and one or more of the network resources based on the information and the data, wherein the deriving the mapping comprises analyzing and comparing the information and the data based on one or more rules or models;
providing a hybrid service design and orchestration (H SDO) system with access to the mapping to facilitate selection by the H-SDO system of particular network resources for supporting one or more metaverse service requests relating to the metaverse object; and
providing a performance report associated with a first network resource of the selection of particular network resources to the H-SDO system to facilitate dynamic adjustment of a service path by the H-SDC system responsive to the performance report exceeding a threshold, wherein the threshold comprises a loading capacity for the first network resource.

2. The device of claim 1, wherein the first network resources comprise physical resources, logical resources, or a combination thereof.

3. The device of claim 1, wherein the processing system comprises a metaverse service and physical world mapping and abstraction layer that is configured to provide the mapping.

4. The device of claim 1, wherein the data identifies a current availability of one or more of the network resources, a load condition of one or more of the network resources, or a combination thereof.

5. The device of claim 1, wherein the data identifies a communication protocol associated with one or more of the network resources, capabilities of one or more of the network resources, services provided by one or more of the network resources, or a combination thereof.

6. The device of claim 1, wherein the data identifies an operating status of one or more of the network resources, operational limits associated with one or more of the network resources, or a combination thereof.

7. The device of claim 1, wherein the information specifies an identifier or ID of the metaverse object, a classification of the metaverse object, or a combination thereof.

8. The device of claim 1, wherein the information identifies a location of the metaverse object within an immersive environment.

9. The device of claim 1, wherein the information identifies a state of mobility of the metaverse object in an immersive environment.

10. The device of claim 1, wherein the information identifies a service-dependent geographic area or location where an instance of the metaverse object is stored.

11. The device of claim 1, wherein the information identifies a community with which the metaverse object is associated.

12. The device of claim 1, wherein the information identifies a minimum or recommended connection bandwidth or speed for experiencing the metaverse object.

13. The device of claim 1, wherein the obtaining the information comprises obtaining the information from one or more metaverse resource inventories, one or more immersion engines, or a combination thereof, and wherein the metaverse object comprises a three-dimensional (3D) avatar associated with a function or feature that is associated with an activity that a user is determined to be presently engaged in.

14. A non-transitory machine-readable medium, comprising executable instructions that, when executed by a processing system of a network system including a processor, facilitate performance of operations, the operations comprising:
obtaining information regarding a metaverse object and data regarding network resources;
deriving a mapping between the metaverse object and one or more of the network resources based on the information and the data, wherein the deriving the mapping comprises analyzing and comparing the information and the data based on one or more rules or models;
providing a hybrid service design and orchestration (H SDO) system with access to the mapping to facilitate selection by the H-SDO system of particular network resources for supporting one or more metaverse service requests relating to the metaverse object; and
providing a performance report associated with a first network resource of the selection of particular network resources to the H-SDO system to facilitate dynamic adjustment of a service path by the H-SDC system responsive to the performance report exceeding a threshold, wherein the threshold comprises a loading capacity for the first network resource.

15. The non-transitory machine-readable medium of claim 14, wherein the first network resources comprise physical resources, logical resources, or a combination thereof.

16. The non-transitory machine-readable medium of claim 14, wherein the processing system comprises a metaverse service and physical world mapping and abstraction layer that is configured to provide the mapping.

17. The non-transitory machine-readable medium of claim 14, wherein the data identifies a current availability of one or more of the network resources, a load condition of one or more of the network resources, or a combination thereof.

18. A method, comprising:
obtaining, by a processing system including a processor, information regarding a metaverse object and data regarding network resources;
deriving, by the processing system, a mapping between the metaverse object and one or more of the network resources based on the information and the data, wherein the deriving the mapping comprises analyzing and comparing the information and the data based on one or more rules or models;
providing, by the processing system, a hybrid service design and orchestration (H SDO) system with access to the mapping to facilitate selection by the H-SDO system of particular network resources for supporting one or more metaverse service requests relating to the metaverse object; and providing, by the processing system, a performance report associated with a first network resource of the selection of particular network resources to the H-SDO system to facilitate dynamic adjustment of a service path by the H-SDC system responsive to the performance report exceeding a threshold, wherein the threshold comprises a loading capacity for the first network resource.

19. The method of claim 18, wherein the information includes metaverse object attributes obtained from one or more metaverse resource inventories, one or more immersion engines, or a combination thereof.

20. The method of claim 18, wherein the network resources comprise physical resources, logical resources, or a combination thereof.

* * * * *

UNITED STATES PATENT AND TRADEMARK OFFICE
CERTIFICATE OF CORRECTION

PATENT NO. : 12,244,673 B2
APPLICATION NO. : 17/846506
DATED : March 4, 2025
INVENTOR(S) : Zhi Cui Page 1 of 1

It is certified that error appears in the above-identified patent and that said Letters Patent is hereby corrected as shown below:

In the Specification

-Column 9, Line 25, delete "(MC)" and insert --(RIC)--.

-Column 9, Line 44, delete "(MC)" and insert --(RIC)--.

-Column 10, Line 20, delete "(MC)" and insert --(RIC)--.

-Column 17, Line 56, insert --5G-- before core.

Signed and Sealed this
Twenty-fourth Day of June, 2025

Coke Morgan Stewart
*Acting Director of the United States Patent and Trademark Office*